United States Patent
Düppre

(10) Patent No.: US 10,947,059 B2
(45) Date of Patent: Mar. 16, 2021

(54) REJECTOR DEVICE

(71) Applicant: Wipotec GmbH, Kaiserslautern (DE)

(72) Inventor: Theo Düppre, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 16/858,680

(22) Filed: Apr. 26, 2020

(65) Prior Publication Data

US 2020/0346876 A1 Nov. 5, 2020

(30) Foreign Application Priority Data

May 3, 2019 (DE) .......................... 102019111515.9

(51) Int. Cl.
  *B65G 47/44* (2006.01)
  *B07C 5/38* (2006.01)
  *B07C 3/00* (2006.01)
  *B07C 5/36* (2006.01)

(52) U.S. Cl.
  CPC .............. *B65G 47/44* (2013.01); *B07C 3/008* (2013.01); *B07C 5/362* (2013.01); *B07C 5/38* (2013.01); *B65G 2203/0216* (2013.01); *B65G 2203/0258* (2013.01); *B65G 2203/042* (2013.01)

(58) Field of Classification Search
  CPC ............................... B65G 47/42; B65G 47/44; B65G 47/46–506; B65G 2203/0216; B65G 2203/0258; B65G 2203/042; B65G 2203/043; B65G 2203/044; B07C 3/008; B07C 3/08; B07C 5/362; B07C 5/38
  See application file for complete search history.

(56) References Cited

U.S. PATENT DOCUMENTS

| 5,620,102 | A | * | 4/1997 | Finch, Jr. | ................ | B07C 5/362 |
| | | | | | | 209/583 |
| 5,896,999 | A | | 4/1999 | Bonnet | | |
| 6,095,314 | A | * | 8/2000 | Fortenbery | ............ | B65G 47/71 |
| | | | | | | 198/360 |

(Continued)

FOREIGN PATENT DOCUMENTS

| DE | 3109174 A1 | 3/1981 |
| DE | 301154 A7 | 12/1983 |

(Continued)

OTHER PUBLICATIONS

GPTO Action dated Feb. 18, 2020 in DE 10 2019 111 515.9.
European patent application No. EP 20 17 2042.2 extended European search report dated Oct. 7, 2020.

*Primary Examiner* — Gene O Crawford
*Assistant Examiner* — Keith R Campbell
(74) *Attorney, Agent, or Firm* — The Culbertson Group, P.C.

(57) ABSTRACT

A rejector device for rejecting discrete products from a product stream includes a transporting means, a rejecting means, and at least two collection containers. The rejecting means can reject the products of the product stream either into one collection container or into the other. In the process, the products are rejected either towards one side of the transporting means or towards the other. The arrangement of the collection containers one above the other on one side of the transporting means makes it possible for the operator to remove products from both collection containers from one side of the rejector device.

18 Claims, 3 Drawing Sheets

(56) References Cited

U.S. PATENT DOCUMENTS

| | | | |
|---|---|---|---|
| 6,705,451 B2* | 3/2004 | Zielinski | B07C 5/362 |
| | | | 198/364 |
| 9,795,995 B2* | 10/2017 | Zimmer | B65G 47/844 |
| 9,962,743 B2* | 5/2018 | Bombaugh | B07C 3/02 |
| 10,022,752 B1* | 7/2018 | Rothermel | B07C 3/08 |
| 2017/0320102 A1 | 11/2017 | McVaugh | |
| 2020/0086354 A1* | 3/2020 | Becher | B07C 5/36 |

FOREIGN PATENT DOCUMENTS

| | | |
|---|---|---|
| DE | 4329193 A1 | 3/1995 |
| EP | 0059984 A2 | 9/1982 |
| FR | 2792555 A1 | 10/2000 |
| JP | 3673381 B2 | 7/2005 |

\* cited by examiner

REJECTOR DEVICE

TECHNICAL FIELD OF THE INVENTION

The present invention relates to a rejector/sorting device for rejecting discrete products from a product stream. Aspects of the invention include both rejector devices and inspection systems employing such rejector devices.

BACKGROUND OF THE INVENTION

Sorting devices are often used downstream of inspection systems for sorting products according to specific product properties. According to predetermined criteria, specific product properties lead to a product either continuing to be transported along the conveying path or being rejected from the conveying path. A specific product property can be, for example, the product weight or the contamination of a product with foreign material. Automatic checkweighers are often used for checking (determining and assessing) the product weight. Inspection devices with X-rays or T-rays can be used for separating out products if contaminated with foreign material. In the quality control of pharmaceutical products, optical control systems which recognize and assess a specific code on the product or its packaging are often used. In the case of the above-mentioned systems, the rejection of a product from the conveying path is usually effected in the transverse direction with respect to the conveying direction for this purpose. The rejected products are collected in collection containers. Corresponding sorting devices usually have to be accommodated in confined spaces. This is the case in particular when already existing inspection systems in the field are to be retrofitted with a sorting device, or when an existing sorting device is to meet further additional sorting criteria. The overall length of the sorting device is to be kept as small as possible. If the products of a product stream are to be sorted according to several different criteria, for example according to contamination or weight of the products, a corresponding amount of installation space for several collection containers is required.

SUMMARY OF THE INVENTION

An object of the present invention is to provide a rejector/sorting device (hereinafter referred to simply as a "rejector device" for convenience) for rejecting products from a product stream, in which the required overall length along the rejector device may be kept as small as possible. The relatively low overall length possible with a rejector device structure in accordance with the present invention is helpful in particular when already existing inspection systems in the field are to be retrofitted with a rejector device. In addition, it should be possible to remove the rejected products from all collection containers from the operator side.

One aspect of the present invention comprises a rejector device for rejecting discrete products from a product stream. Embodiments of such a rejector device may have a transporting means, at least one rejecting means and at least two collection containers. A conveying path for conveying the products leads in a conveying direction X via the transporting means. The rejecting means serves for selectively rejecting the products from the conveying path towards one of the two opposite sides of the transporting means. The two opposite sides are located substantially in the transverse direction Y with respect to the conveying direction X, i.e. conveying direction and transverse direction extend substantially perpendicular to one another. In the following, the two opposite sides are referred to as "first and second side". The first side is also the operator side, on which the operator of the inspection system is located. The at least two collection containers in each case serve for receiving the products rejected from the conveying path by the rejecting means. The rejector device is characterized in that the at least two collection containers are arranged at least partially one above the other in a direction Z, wherein the direction Z extends perpendicular to the conveying direction X and perpendicular to the transverse direction Y. Furthermore, the rejector device is characterized in that the at least two collection containers are arranged such that the products can be removed from all of the at least two collection containers from the same side of the transporting means, preferably from the first side, on which an operator terminal for operating the inspection system can also be located. That is, all of the at least two collection containers are accessible the same side of the transporting means, preferably but not necessarily, the first side. For this accessibility from the same side of the transporting means it is preferred that all of the at least two containers are arranged at least partially on the same side of the two opposite sides of the transporting means.

As used in this disclosure and the accompanying claims, a "discrete product" is intended to mean a product which is not present in the form of a bulk material, but rather is preferably present as an individual item. A discrete product may thus include a single unpackaged item such as a pharmaceutical capsule, a single package containing one or more items, and also a number of connected packages each of which may contain one or more items.

The transporting means can convey the products actively or passively. An actively conveying transporting means may be a belt conveyor, modular belt conveyor, toothed belt conveyor, chain conveyor, plate link conveyor or slat chain conveyor, for example. A passively conveying transporting means may be, for example, a sliding plane along which the products can slide.

As already mentioned at the beginning, the rejector device according to the invention can be used in inspection systems which have an automatic checkweigher and/or an inspection device comprising an electromagnetic radiation scanning device such as an X-ray or T-ray imaging or scanning device and/or an optical control system for code recognition on products or the packaging thereof, in particular packaging in the pharmaceutical field. The present invention therefore also relates to the corresponding use of a rejector device in accordance with the invention in an inspection system. The automatic checkweighers, inspection devices or optical control systems may serve for the recognition and assessment of specific product properties. According to predetermined criteria, the products can then either continue to be transported along the conveying path or be rejected from the conveying path according to their individual product properties.

The at least two collection containers are arranged at least partially one above the other in the direction Z, wherein the direction Z is preferably perpendicular to the plane which is spanned by the conveying direction X and the transverse direction Y. "Arranged at least partially one above the other" means that the footprints of the at least two collection containers in the X-Y plane at least partially overlap. The at least two collection containers can have congruent footprints. However, the two collection containers can also have different footprints. Then, for example, one of the collection containers can extend in the transverse direction Y underneath the transporting means, as is described further below herein.

In some embodiments, a rejector device according to the invention is preferably formed such that the products move along a first path when rejected from the conveying path towards the first side or move along a second path when moved out towards the second side, wherein the first path opens into a first collection container and the second path opens into a second collection container.

A rejector device according to the invention can have a rejecting means comprising a single rejecting device or comprising several rejecting devices. If the rejector device according to the invention has a rejecting means including only a single rejecting device, that single rejecting device can reject the products along the first and the second path. If the rejector device according to the invention has a rejecting means including two or more rejecting devices, one those multiple rejecting devices can reject products along the first path and a different one of the multiple rejecting devices can reject products along the second path. The rejection can be effected in a rejecting device by means of a slider or a blowing nozzle, for example.

The first receiving container is preferably arranged adjacent to the transporting means on the first side. To receive the products, the first collection container has a receiving opening via which the product rejected from the conveying path towards the first side can enter the first collection container.

In some embodiments of a rejector device according to the invention, the second path can lead under the transporting means through into the second collection container. The at least two collection containers can thereby be arranged together in a space-saving manner on the same side of the transporting means. This also guarantees that both collection containers are accessible from the operator side.

In some embodiments of a rejector device in accordance with the present invention, the second collection container can extend spatially in the direction Y, preferably such that at least a part of the second collection container is located underneath the transporting means.

The products on the second path in some embodiments of the rejector device may be guided into the second collection container via a chute. For this purpose, a receiving opening of the chute is preferably arranged adjacent to the transporting means on the second side. The chute can be present in the form of a chute open on one side or be present at least partially in the form of a closed channel. For specific reasons, the closed channel form can be preferred.

The arrangement of the at least two collection containers on the same side of the opposite sides of the conveying path has the advantage that the products collected in the collection containers can be removed from one side, the operator side, of the inspection system. For this purpose, the at least two collection containers can each have at least one removal opening, which is formed in each case in an accessible location comprising a location such that an operator can remove the products from both collection containers from the same side (preferably the operator side). An accessible location in this sense means that the removal opening generally faces the operator station relative to the rejector device or at least can be reached by an operator located at the operator station.

In some embodiments of a rejector device according to the invention, the second collection container can extend in the transverse direction Y under the transporting means through to the second side of the transporting means. The second collection container preferably extends in the transverse direction Y beyond the edge of the transporting means. A product rejected towards the second side of the transporting means can thereby enter the second collection container in the direction Z, for example via a drop shaft. The drop shaft can be part of the second collection container. An opening in the drop shaft for receiving the products is preferably located adjacent to the second side of the transporting means. In addition to the removal opening on the first side of the transporting means, the second collection container can contain a removal opening for the products on the second side of the transporting means.

In a separate embodiment, the present invention also relates to a rejector device for rejecting discrete products from a product stream, with a transporting means, via which a conveying path for conveying products leads in a conveying direction X, and with at least one rejecting means for selectively rejecting the products from the conveying path towards one of the two opposite sides of the transporting means, which are each in the transverse direction Y with respect to the conveying direction X, and with at least one collection container for receiving the products rejected from the conveying path by the rejecting means. In the following, the two opposite sides are referred to as "first and second side". The rejector device in this separate embodiment is characterized in that the collection container extends in the transverse direction Y under the transporting means from the first side to the second side of the transporting means. The collection container preferably extends in the transverse direction Y on the second side beyond the edge of the transporting means. A product rejected towards the second side of the transporting means can thereby enter the second collection container in the direction Z, for example via a drop shaft. The drop shaft can be part of the collection container. An opening in the drop shaft for receiving the products is preferably located adjacent to the second side of the transporting means. The collection container can contain a removal opening for the products on the second side of the transporting means. Alternatively or in addition, the collection container can have a removal opening on the first side of the transporting means. All designs and preferred embodiments mentioned further above of the rejector device described first herein can be combined with the rejector device of the separate embodiment, unless they are mutually exclusive.

These and other advantages and features of the invention will be apparent from the following description of representative embodiments, considered along with the accompanying drawings.

DESCRIPTION OF REPRESENTATIVE EMBODIMENTS

Figure 1:
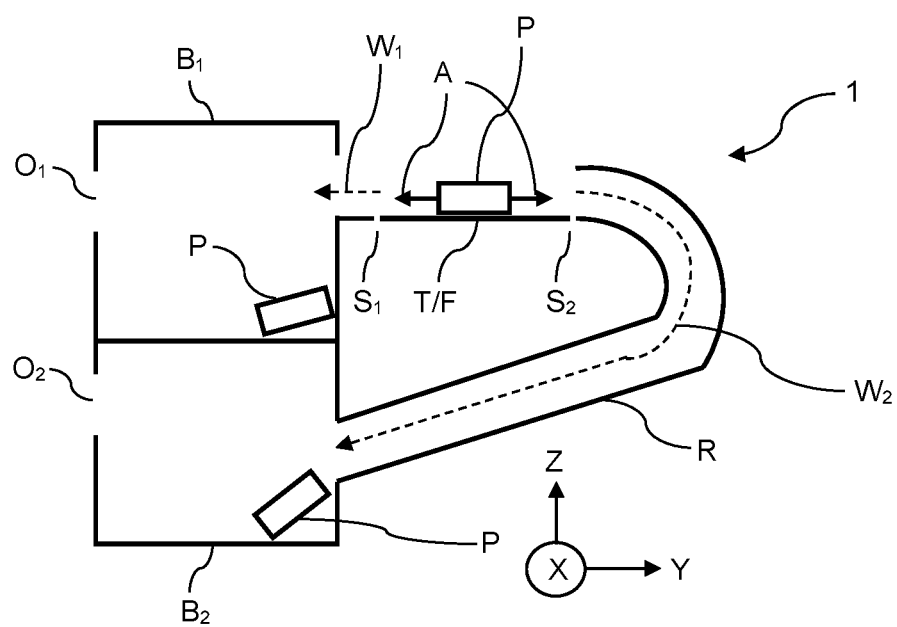
FIG. 1 schematically shows a rejector device according to the invention.

The rejector device 1 shown in FIG. 1 has a transporting means T, via which a conveying path F leads. In FIG. 1, the conveying path F runs along the conveying direction X, which extends perpendicular to the plane of the figure. Here, the transporting means T is a conveyor belt, for example. The products P located on the conveyor belt can be moved in the transverse direction Y as shown by arrows $A_1$ and $A_2$ with a rejecting means A (shown only in FIG. 3) either towards one side $S_1$ of the conveying path F or towards the opposite side $S_2$ of the conveying path F. A product P can enter a first collection container $B_1$ via a first path $W_1$. For this purpose, the first collection container $B_1$ is arranged adjacent to the transporting means T on the first side $S_1$ thereof. However, the product P can also take a second path $W_2$ by moving sideways from the conveying path F towards the opposite side $S_2$. For this purpose, the rejecting means A pushes the product P towards the side $S_2$ of the transporting means T, to which a chute R is adjacent, via which the product P can enter a second collection container $B_2$. The paths $W_1$ and $W_2$ are indicated with dashed arrows in FIG. 1. The chute R leads through underneath the transporting means T, with the result that the products P can enter the collection container $B_2$ arranged underneath the collection container $B_1$ via the path $W_2$. In this way it is possible, through selective pushing out towards the first side $S_1$ or towards the second side $S_2$, to transfer or to sort the products P into collection containers $B_1$ and $B_2$ arranged one above the other. Through the chute R, it is thus possible to arrange the two collection containers $B_1$ and $B_2$ one above the other in the direction Z in a space-saving manner. This has the further advantage that the products P can be removed from the collection containers $B_1$ and $B_2$ from the same side of the transporting means T.

Figure 2:
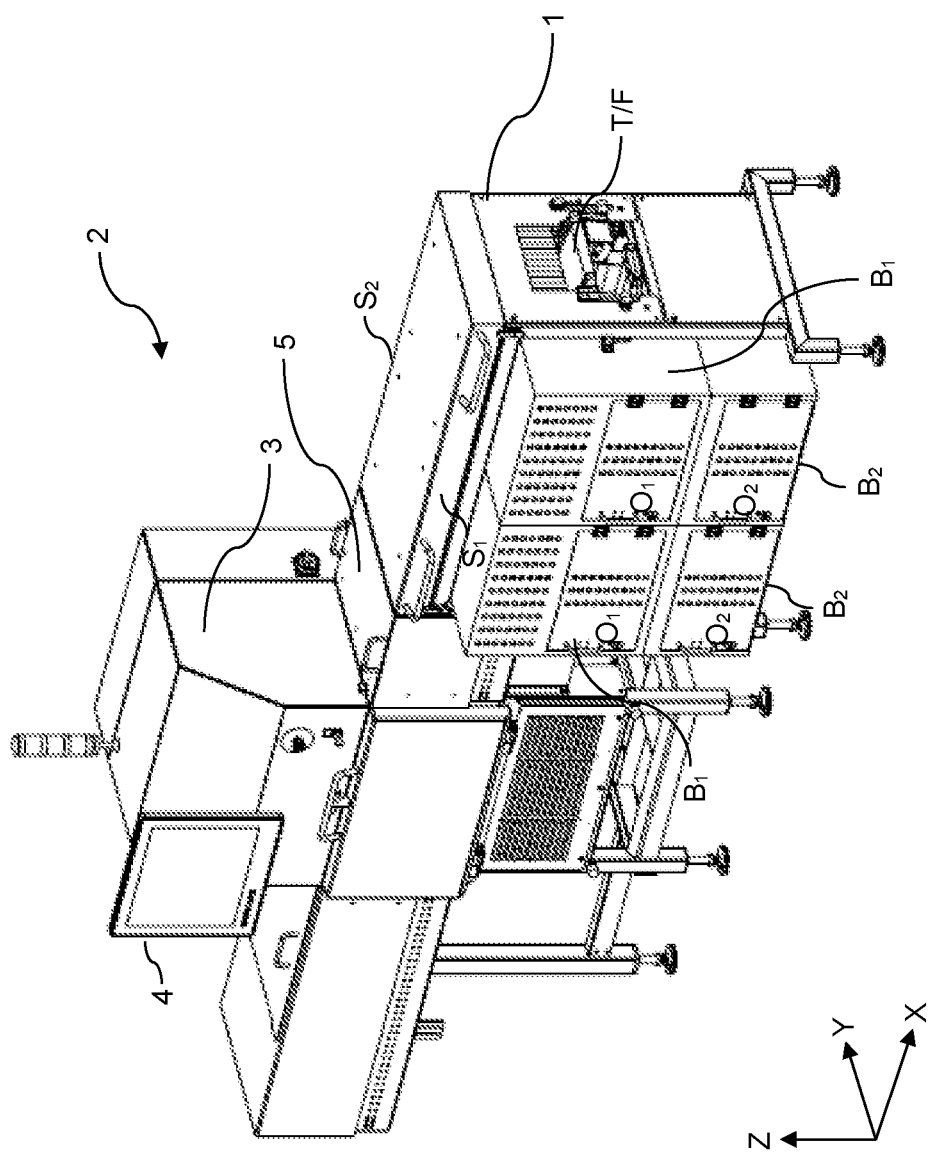
FIG. 2 shows an inspection system with a rejector device according to the invention in an oblique view.
Figure 3:
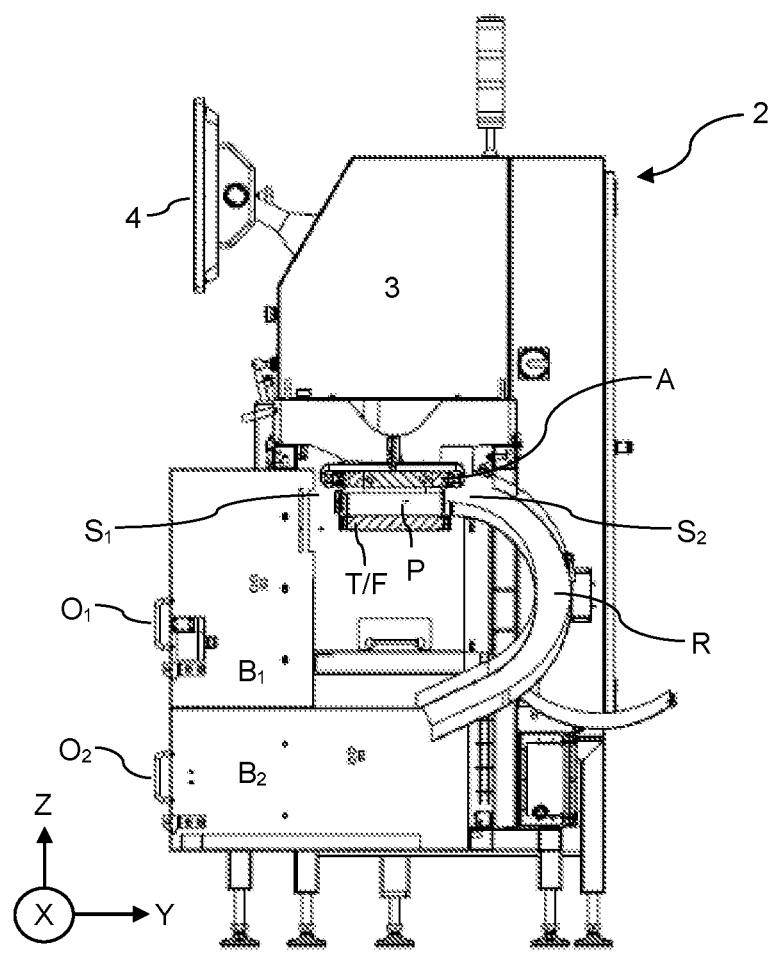
FIG. 3 shows a section through the inspection system according to FIG. 2 in a side view looking along the conveying direction.

FIGS. 2 and 3 show an inspection system 2 with a rejector device 1 according to the invention. The conveying path F of a transporting means T in the form of a conveyor belt runs along the conveying direction X. In addition to the rejector device 1 according to the invention, the inspection system 2 has an X-ray device 3. Through the X-ray device 3, specific product properties, e.g. contamination with foreign material, can be detected. Depending on the product property detected, the products P transported on the conveying path F can either continue to be transported along the conveying path F or be rejected into the collection containers $B_1$ or $B_2$ according to predetermined criteria. As can be seen from FIG. 2, the inspection system 2 represented has in each case two first collection containers $B_1$ and two second collection containers $B_2$. In this way, products P can be rejected at two different points of the conveying path F. The two second collection containers $B_2$ are in each case arranged underneath the two first containers $B_1$ in the direction Z. Through selective rejection in the transverse direction Y towards the first side $S_1$ or towards the second side $S_2$ of the conveying path F by means of a rejecting means A, products can enter either the first collection container $B_1$ or the second collection container $B_2$, respectively. Here, the two first collection containers $B_1$ are arranged adjacent to the transporting means T on the first side $S_1$ thereof. The two second collection containers $B_2$ extend in each case in the direction Y underneath the transporting means T. The products P rejected in the direction of the second side $S_2$ enter the second collection container $B_2$ via a dedicated chute R in each case. The chute R leads through at least partially underneath the transporting means T. In this way, the two collection containers $B_1$ and $B_2$ are in each case arranged such that they are accessible from the operator side via the removal openings $O_1$ and $O_2$. The operator side is identical to the first side $S_1$. The inspection system 2 can also have an operator terminal 4 for the operator on the operator side. Furthermore, the inspection system 2 can have a weighing machine 5 for measuring the product weight.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMBERS 1 rejector device
2 inspection system
3 X-ray device
P product
T transporting means
F conveying path
A rejecting means
$A_1$, $A_2$ displacement directions for selected products
$S_1$ first side of the conveying path (operator side)
$S_2$ second side of the conveying path
$B_1$ first collection container
$B_2$ second collection container
$W_1$ first path
$W_2$ second path
$O_1$ removal opening of the first collection container
$O_2$ removal opening of the second collection container
R chute
X conveying direction
Y transverse direction
Z direction perpendicular to the plane which is spanned by conveying direction and transverse direction
4 operator terminal
5 weighing machine

The invention claimed is:
1. A rejector device for rejecting discrete products from a product stream, the rejector device including:
(a) transporting means for conveying products in a conveying direction along a conveying path, the transporting means having a first side along the conveying path and a second side along the conveying path, the first side and second side being spaced apart in a transverse direction which extends transverse to the conveying direction so that the first side and second side lie opposite to each other across the conveying path;
(b) rejecting means for rejecting selected products from the products conveyed along the conveying path such that each selected product is moved from the conveying path towards a one of the first side and the second side of the transporting means chosen for that selected product;
(c) a first collection container for receiving a respective selected product moved from the conveying path by the rejecting means toward the first side of the transporting means; and
(d) a second collection container for receiving a respective selected product moved from the conveying path by the rejecting means toward the second side of the transporting means, wherein the first and second collection containers are arranged at least partially one above the other in a Z direction which extends perpendicular to both the conveying direction and the transverse direction, and wherein the first collection container and the second collection container are each accessible from one of the first side and the second side of the transporting means.

2. The rejector device of claim 1 wherein the first collection container and the second collection container are each located at least partially on the one of the first side and second side of the transporting means from which they are accessible.

3. The rejector device of claim 1 wherein a respective one of the selected products moves along a first path when rejected from the conveying path towards the first side of the transporting means and moves along a second path when rejected from the conveying path towards the second side of the transporting means, wherein the first path leads into the first collection container and the second path leads into the second collection container.

4. The rejector device of claim 3 wherein the first collection container is arranged adjacent to the first side of the transporting means.

5. The rejector device according to claim 3 wherein the second path leads under the transporting means into the second collection container.

6. The rejector device of claim 3 wherein the second path is formed at least in part along a chute.

7. The rejector device of claim 6 wherein the chute along at least a portion of a length thereof comprises a closed channel.

8. The rejector device of claim 1 wherein the second collection container extends in the transverse direction under the transporting means from the first side of the transporting means to the second side of the transporting means.

9. The rejector device of claim 1 wherein the first collection container includes a first product removal opening and the second collection container includes a second product removal opening, the first product removal opening and the second product removal opening each being in an accessible location with respect to the one of the first side and the second side of the transporting means from which the first collection container and second collection container are accessible.

10. An inspection system including:
(a) inspection means for inspecting at least one characteristic of each product in a stream of products, the inspection means including at least one of a weighing machine, an electromagnetic radiation scanning device, and an optical code recognition device; and
(b) a rejection device including,
(i) transporting means for conveying the stream of products in a conveying direction along a conveying path from the inspection means, the transporting means having a first side along the conveying path and a second side along the conveying path, the first side and second side being spaced apart in a transverse direction which extends transverse to the conveying direction so that the first side and second side lie opposite to each other across the conveying path;
(ii) rejecting means for rejecting selected products from the stream of products conveyed along the conveying path such that each selected product is moved from the conveying path towards one of the first side and the second side of the transporting means chosen for that selected product;
(iii) a first collection container for receiving a respective selected product moved from the conveying path by the rejecting means toward the first side of the transporting means; and
(iv) a second collection container for receiving a respective selected product moved from the conveying path by the rejecting means toward the second side of the transporting means, wherein the first and second collection containers are arranged at least partially one above the other in a Z direction which extends perpendicular to both the conveying direction and the transverse direction, and wherein the first collection container and the second collection container are each accessible from one of the first side and the second side of the transporting means.

11. The inspection system of claim 10 wherein the first collection container and the second collection container are each located at least partially on the one of the first side and second side of the transporting means from which they are accessible.

12. The inspection system of claim 10 wherein a respective one of the selected products moves along a first path when rejected from the conveying path towards the first side of the transporting means and moves along a second path when rejected from the conveying path towards the second side of the transporting means, wherein the first path leads into the first collection container and the second path leads into the second collection container.

13. The inspection system of claim 12 wherein the first collection container is arranged adjacent to the first side of the transporting means.

14. The inspection system according to claim 12 wherein the second path leads under the transporting means into the second collection container.

15. The inspection system of claim 12 wherein the second path is formed at least in part along a chute.

16. The inspection system of claim 15 wherein the chute along at least a portion of a length thereof comprises a closed channel.

17. The inspection system of claim 10 wherein the second collection container extends in the transverse direction under the transporting means from the first side of the transporting means to the second side of the transporting means.

18. The inspection system of claim 10 wherein the first collection container includes a first product removal opening and the second collection container includes a second product removal opening, the first product removal opening and the second product removal opening each being in an accessible location with respect to the one of the first side and the second side of the transporting means from which the first collection container and second collection container are accessible.

\* \* \* \* \*